Patented July 27, 1937

2,088,267

UNITED STATES PATENT OFFICE 2,088,267

PROCESS OF REDUCING BY WASHING THE ACIDITY OF DAIRY PRODUCTS

Otto Karpeles, Vienna, Austria, assignor to "Elact" Gesellschaft für elektrische Apparate Ges. m. b. H., Vienna, Austria, a Company of Austria No Drawing. Application March 29, 1934, Serial No. 718,089. In Austria April 20, 1933

3 Claims. (Cl. 99—60)

This invention relates to a process of reducing by washing the acidity of dairy products such as for instance butter, cream, fats, oils and so forth.

It is already known to neutralize by bases or to eliminate by repeated washing with water or skimmed milk, the acid contained in milk, cream and the like. Further it is known to regenerate butter by washing it and subsequently treating the same with fresh unskimmed or skimmed milk or butter milk. However the washing was successful only if, at least to the first washing water, a base was added. The taste is changed and, under certain conditions, a fostering medium for fermentative bacteria is generated by the added bases.

The washing process has to be repeated several times and therefore it takes much time and is expensive. Finally it is known to improve the quality of butter by forming back the cream by the solution of the butter and subjecting the same to a higher temperature for some time. Hereafter the mixture passes through a homogenizing machine and finally ferments or butyric ether are added to the mixture in a cream maturer and, after the cream has matured, the mixture is buttered again.

Further it has been proposed to subject fats in a finely divided condition to the action of a washing liquid, which divides the fat into small parts. Also milk or liquids produced from milk and acidified by the addition of lactic acid bacteria have been used as washing liquid.

The present invention relates to a process which consists in reducing the acidity of dairy products or of fats, oils and the like by washing the same in unskimmed or skimmed milk in which the percentage of acid is reduced in known electrochemical manner. Thereby the milk, used as washing liquid, can be set to 0° SH (Soxhleth-Henkel) degree of acidity and therefore it is possible to exactly predetermine the reaction of the same on the produce to be treated.

*Example*

Cream is mixed, emulsified or homogenized with the electrochemically treated milk and subsequently the milk is removed again by an extractor.

Animal or vegetable fats or oils are treated in the same way.

In place of milk can be used also whey, curds, sour milk and all other dairy residues, either alone or in mixture. Also skimmed milk or the like can be used if its degree of acidity has been reduced in a chemical or physical way. For instance by the addition of bases or salts or by precipitating the casein showing an acid reaction by introducing oxidizing or deoxidizing gases, it is possible to reduce the acidity in such a manner, that the washing liquid reacts in a slightly acid or basic manner.

Also in these cases, the process is carried out in the same way as in connection with the example first described.

What I claim is:—

1. A process of reducing the acidity of dairy products such as butter, cream, milk, fats and oils, by the aid of a washing liquid selected from a group of dairy residues consisting of milk, whey, and sour milk in which the percentage of acid is smaller than that of the dairy product to be deacidified; which process consists in first reducing the degree of acidity of the washing liquid by a known electro-chemical action to a substantially neutral reaction, then mixing said liquid with said dairy product, emulsifying the mixture, and finally extracting said washing liquid.

2. A process as claimed in claim 1 in which the dairy residues consist of milk which has been deprived of one of the constituents of unskimmed milk.

3. A process as claimed in claim 1 in which the dairy residues consist of milk which has been deprived of some of the constituents of unskimmed milk.

OTTO KARPELES.